United States Patent
Liu et al.

(10) Patent No.: US 10,056,821 B2
(45) Date of Patent: Aug. 21, 2018

(54) POWER CONVERSION SYSTEM AND METHOD FOR SUPPRESSING THE COMMON-MODE VOLTAGE THEREOF

(71) Applicant: Delta Electronics (Shanghai) Co., Ltd., Shanghai (CN)

(72) Inventors: Teng Liu, Shanghai (CN); Jianping Ying, Shanghai (CN); Hongjian Gan, Shanghai (CN); Lifeng Qiao, Shanghai (CN); Yi Zhang, Shanghai (CN); Zheng Wang, Shanghai (CN); Zhao Wang, Shanghai (CN); Yong Zeng, Shanghai (CN)

(73) Assignee: DELTA ELECTRONICS (SHANGHAI) CO.,LTD., Shanghai (CN)

( * ) Notice: Subject to any disclaimer, the term of this patent is extended or adjusted under 35 U.S.C. 154(b) by 0 days.

(21) Appl. No.: 15/491,961

(22) Filed: Apr. 19, 2017

(65) Prior Publication Data

US 2018/0041110 A1 Feb. 8, 2018

(30) Foreign Application Priority Data

Aug. 5, 2016 (CN) .......................... 2016 1 0637511

(51) Int. Cl.
  *H02P 3/00* (2006.01)
  *H02M 1/12* (2006.01)
  *H02M 5/458* (2006.01)
  *H02P 27/06* (2006.01)

(52) U.S. Cl.
  CPC ......... *H02M 1/126* (2013.01); *H02M 5/4585* (2013.01); *H02P 27/06* (2013.01); *H02M 2001/123* (2013.01)

(58) Field of Classification Search
  CPC ............... H02M 1/126; H02M 5/4585; H02M 2001/123; H02P 27/06
  USPC ......................................................... 318/504
  See application file for complete search history.

(56) References Cited

U.S. PATENT DOCUMENTS

| 2003/0053324 | A1* | 3/2003 | Yamamoto ................ B60L 9/16 363/127 |
| 2014/0211520 | A1* | 7/2014 | Zhang ................... H02M 1/126 363/37 |
| 2015/0016155 | A1* | 1/2015 | Lee ................... H02M 7/53875 363/44 |

* cited by examiner

*Primary Examiner* — Rina Duda
*Assistant Examiner* — Gabriel Agared
(74) *Attorney, Agent, or Firm* — CKC & Partners Co., LTD.

(57) ABSTRACT

The present disclosure discloses a power conversion system and a method for suppressing the common-mode voltage. The power conversion system comprises a grid-side converter, a motor-side converter, a bus capacitor, a first reactor, a second reactor, and a third reactor. The bus capacitor is electrically connected between the grid-side converter and the motor-side converter. The first reactor includes a first terminal and a second terminal, wherein the first terminal is electrically connected to the motor-side converter. The second reactor includes a first terminal and a second terminal, wherein the first terminal is electrically connected to the second terminal of the first reactor and the second terminal of the second reactor is electrically connected to a motor. The third reactor includes a first terminal and a second terminal, wherein the first terminal is electrically connected to a grid and the second terminal is electrically connected to the grid-side converter.

22 Claims, 13 Drawing Sheets

POWER CONVERSION SYSTEM AND METHOD FOR SUPPRESSING THE COMMON-MODE VOLTAGE THEREOF

CROSS-REFERENCE TO RELATED APPLICATIONS

This non-provisional application claims priority under 35 U.S.C. § 119(a) on Patent Application. No. 201610637511.3 filed in P. R. China on Aug. 5, 2016, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to a power conversion system, and particularly to a power conversion system capable of reducing common-mode voltage and a method for suppressing the common-mode voltage.

BACKGROUND ART

The output voltage of a voltage source type power conversion system is with few harmonic components and high output capacity, so the voltage source type power conversion system is suitable for applications involving medium or high voltage, and has been widely applied in modern industry. In the same input voltage and output voltage, compared with a general cascaded high voltage conversion system, a voltage source type power conversion system has a higher voltage jump, thus a common-mode voltage of the source type power conversion system is more serious. The common-mode voltage of the voltage source type power conversion system generates current to ground or motor bearing current through the coupling capacitance between the stator and the rotor of a motor, while a large bearing current will probably affect the service life of the motor, as well as leading to grid-to-ground voltage being increased, thereby affecting the operation of other equipments. In view of the hazard of common-mode voltage, how to reduce the common-mode voltage of a power conversion system has become a focus of industrial circles and universities. Conventionally, to eliminate the common-mode voltage of a voltage source type power conversion system, the voltage endurance capability of an isolation transformer is enhanced to bear the common-mode voltage, which makes the volume of the isolation transformer larger, the costs higher and results in that the voltage source type power conversion system has a less efficiency, a reduced power density and reduced reliability, etc.

In modern industrial applications, in order to weaken the serious hazard to a voltage source type power conversion system by the common-mode voltage, passive common-mode voltage filters applied to voltage source type power conversion systems and methods for suppressing common-mode voltage have being studied to suppress the effects that common-mode voltage imposes on voltage source type power conversion systems.

DISCLOSURE OF THE INVENTION

The technical problem to be solved by the present disclosure is to provide a power conversion system, characterized in that the power conversion system comprises:
a grid-side converter;
a motor-side converter;
a bus capacitor, the bus capacitor being electrically connected between the grid-side converter and the motor-side converter;
a first reactor, which includes a first terminal and a second terminal, the first terminal of the first reactor being electrically connected to the motor-side converter;
a second reactor, which includes a first terminal and a second terminal, the first terminal of the second reactor being electrically connected to the second terminal of the first reactor and the second terminal of the second reactor being electrically connected to a motor; and
a third reactor, which includes a first terminal and a second terminal, the first terminal of the third reactor being electrically connected to a grid and the second terminal of the third reactor being electrically connected to the grid-side converter.

The present disclosure further provides a method for suppressing the common-mode voltage of a power conversion system, characterized in that it is applied to the power conversion system according to the preceding claim 9, the method for suppressing common-mode voltage comprising:
step 1: outputting a first voltage according to a voltage and a current of a grid and a voltage of a bus capacitor; outputting a second voltage according to an output current of a motor-side converter or a rotate speed set value of a motor or a measured value of the rotate speed of the motor or an input voltage of the motor;
step 2: injecting first common-mode voltage into the first voltage to output a first control signal, and injecting second common-mode voltage into the second voltage to output a second control signal by using a control means; and
step 3: controlling the ON or OFF of the power semiconductor switches of the grid-side converter and the motor-side converter, respectively by using the first control signal and the second control signal.

With respect to the prior art, the power conversion system and the method for suppressing the common-mode voltage of the present disclosure have the effects that they can suppress the common-mode voltage of a power conversion system effectively, reduce the voltage to ground at the grid-side and the motor-side while reducing the volume of the power conversion system and reducing the cost.

EMBODIMENTS

As regards the details and technical description of the present disclosure, a preferred embodiment is provided for further illustration, but should not be construed as limiting the implementation of the present disclosure.

Figure 1:
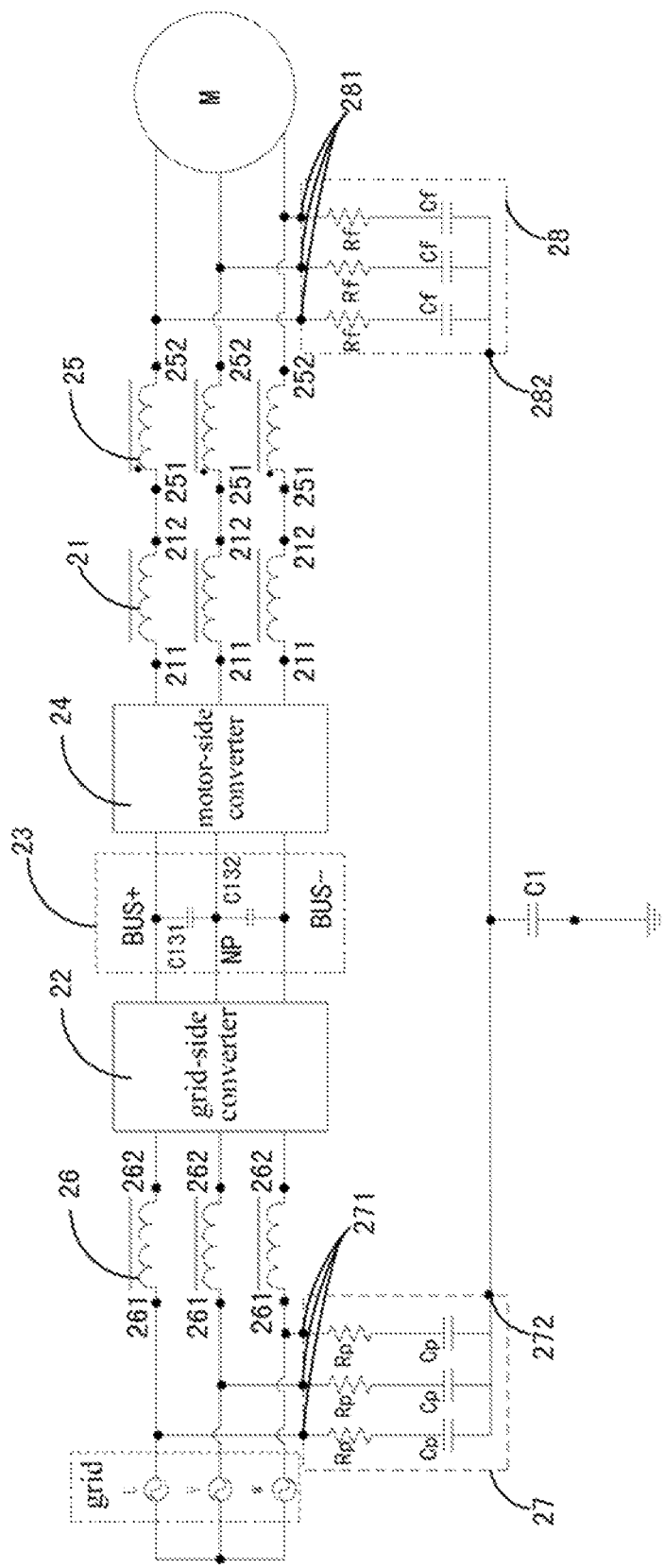
FIG. 1 is a schematic view showing the structure of the power conversion system in the first embodiment of the present disclosure.

Referring to FIG. 1, FIG. 1 is a schematic view showing the structure of the power conversion system in the first embodiment of the present disclosure. As shown in FIG. 1, the power conversion system according to the present disclosure comprises a first reactor 21, a grid-side converter 22, a bus capacitor 23, a motor-side converter 24, a second reactor 25, a third reactor 26, a first filter network 27, a second filter network 28 and a motor M. The bus capacitor 23 is electrically connected between the grid-side converter 22 and the motor-side converter 24. In this embodiment, the bus capacitor 23 may include a first bus capacitor C131 and a second bus capacitor C132, wherein one terminal of the first bus capacitor C131 is connected to a positive DC bus terminal BUS+ and the other terminal is connected to a neutral point NP of the bus capacitor 23; while one terminal of the second bus capacitor C132 is connected to the neutral point NP of the bus capacitor 23 and the other terminal is connected to a negative DC bus terminal BUS−. In other embodiments, the bus capacitor 23 may include only one capacitor; the first reactor 21 includes a first terminal 211 and a second terminal 212, with the first terminal 211 of the first reactor 21 being electrically connected to the motor-side converter 24; the second reactor 25 includes a first terminal 251 and a second terminal 252, with the first terminal 251 of the second reactor 25 being electrically connected to the second terminal 212 of the first reactor 21 and the second terminal 252 of the second reactor 25 being electrically connected to a motor M; the third reactor 26 includes a first terminal 261 and a second terminal 262, with the first terminal 261 of the third reactor 26 being electrically connected to a grid, specifically, being respectively connected to Phase U, Phase V and Phase W of the grid, and the second terminal 262 of the third reactor 26 being electrically connected to the grid-side converter 22; the first filter network 27 includes a first terminal 271 and a second terminal 272, with the first terminal 271 of the first filter network 27 being electrically connected to the grid and the first terminal 261 of the third reactor 26; the second filter network 28 includes a first terminal 281 and a second terminal 282, with the first terminal 281 of the second filter network 28 being electrically connected to the second terminal 252 of the second reactor 25 and the motor M; the second terminal 272 of the first filter network 27 is electrically connected to the second terminal 282 of the second filler network 28; the first terminal of the first capacitor C1 is electrically connected to the second terminal 272 of the first filter network 27 and the second terminal 282 of the second filter network 28, and the second terminal of the first capacitor C1 is grounded. In this embodiment, the first reactor and the third reactor are differential mode reactors, and the second reactor is a common-mode reactor. But the present disclosure is not limited thereto.

The power conversion system of the present disclosure replaces the conventional isolation transformer with the first filter network 27, the second filter network 28 and the second reactor 25, so as to greatly reduce the volume and cost of the converter. Moreover, instead of the conventional practice that the motor-side resistor-capacitor network is directly grounded, the first filter network 27 and the second filter network 28 are grounded through the first capacitor C1, so, the ground capacitor only needs be basically insulated and the capacitors of the first filter network 27 and the second filter network 28 only need be functionally insulated, which results in that the volumes and costs of capacitors can be reduced.

Figure 2:
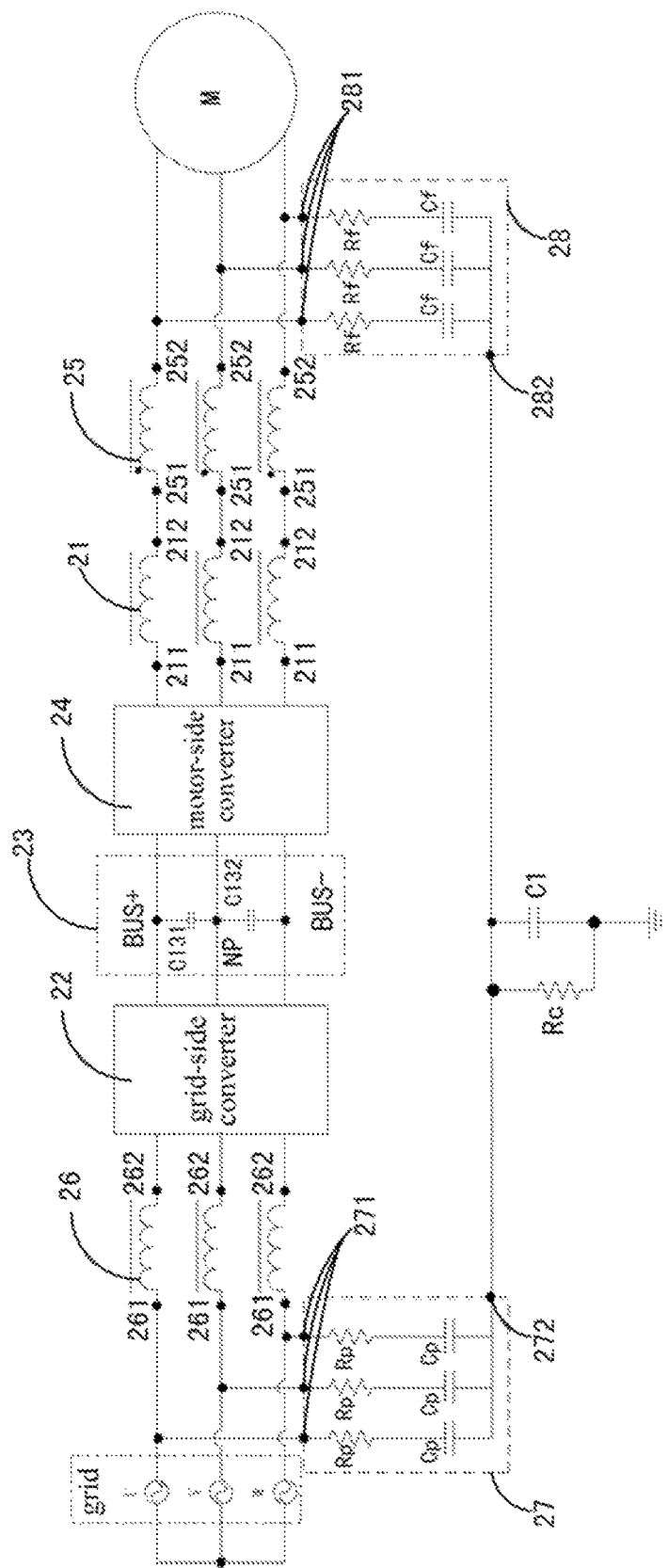
FIG. 2 is a schematic view the structure of the power conversion system in the second embodiment of the present disclosure.

Referring to FIG. 2, FIG. 2 is a schematic view the structure of the power conversion system in the second embodiment of the present disclosure. The structure of the power conversion system shown in FIG. 2 is substantially the same as that of the power conversion system shown in FIG. 1. The same parts will not be repeated here, and the different parts will be described below. The power conversion system shown in FIG. 2 further comprises a resistor Rc connected in parallel with the first and second terminals of the first capacitor C1. The voltage on C1 is adjusted by the resistors Rc, so that the withstand voltage requirement of the first capacitor C1 can be further lowered, thereby reducing the volume and cost of the first capacitor C1.

Figure 3:
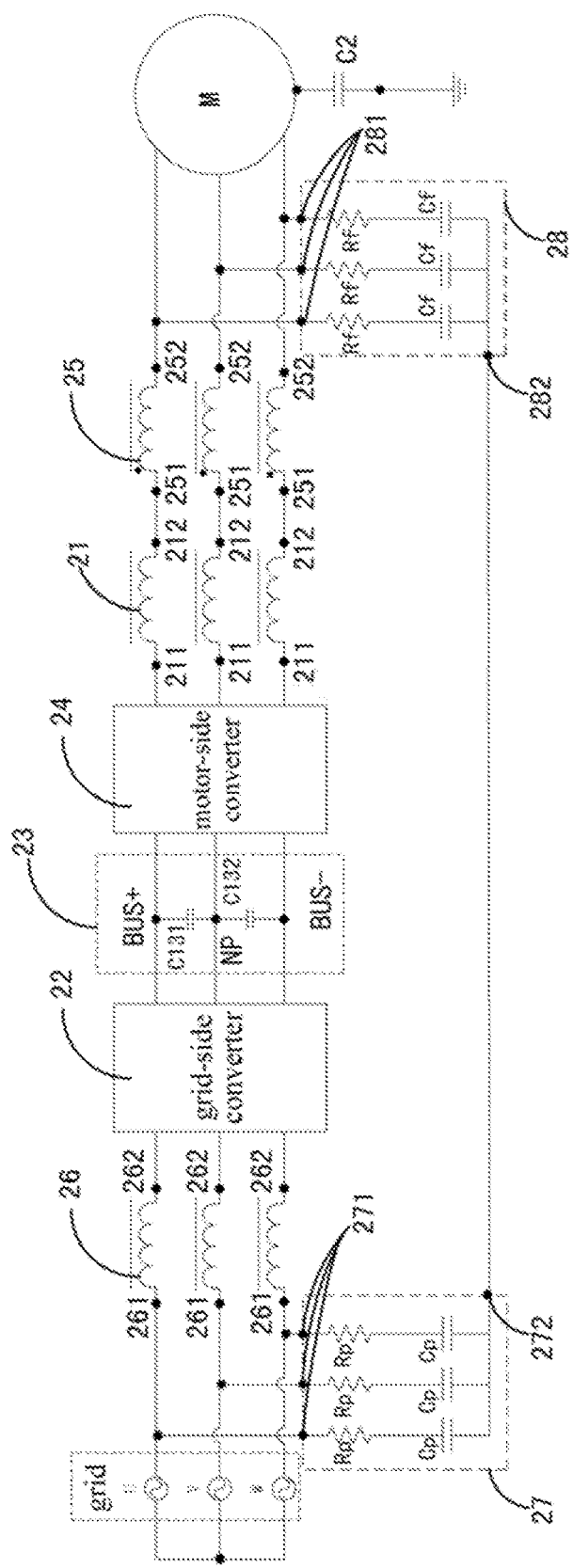
FIG. 3 is a schematic view showing the structure of the power conversion system in the third embodiment of the present disclosure.

Referring to FIG. 3, FIG. 3 is a schematic view showing the structure of the power conversion system in the third embodiment of the present disclosure. The structure of the power conversion system shown in FIG. 3 is substantially the same as that of the power conversion system shown in FIG. 1. The same parts will not be repeated here, and the different parts will be described below. The power conversion system shown in FIG. 3 comprises a second capacitor C2 but is not provided with a first capacitor C1, wherein the first terminal of the second capacitor C2 is electrically connected to the motor M while the second terminal of the second capacitor C2 is grounded.

Figure 6:
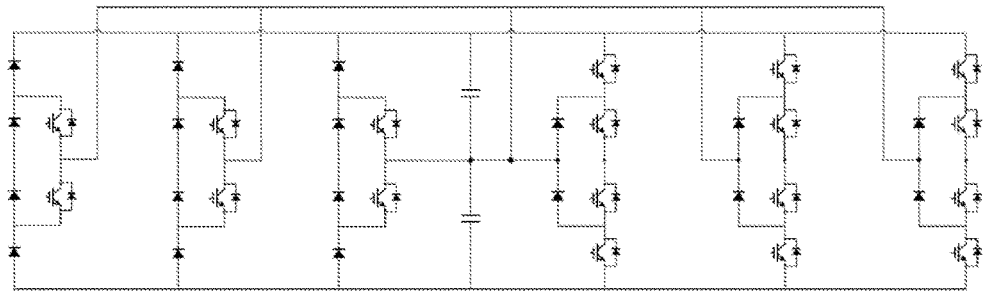
FIG. 6 is a schematic view showing the topology of the main circuit of a rectifying, inverting, asymmetric voltage source type three-level converter.
Figure 7:
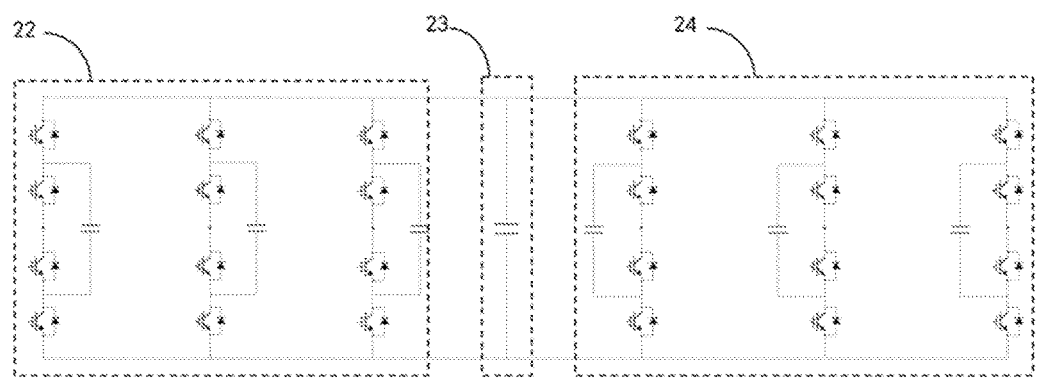
FIG. 7 is a schematic view showing the topology of the main circuit of a rectifying, inverting, symmetric voltage source type flying capacitor three-level converter.
Figure 8:
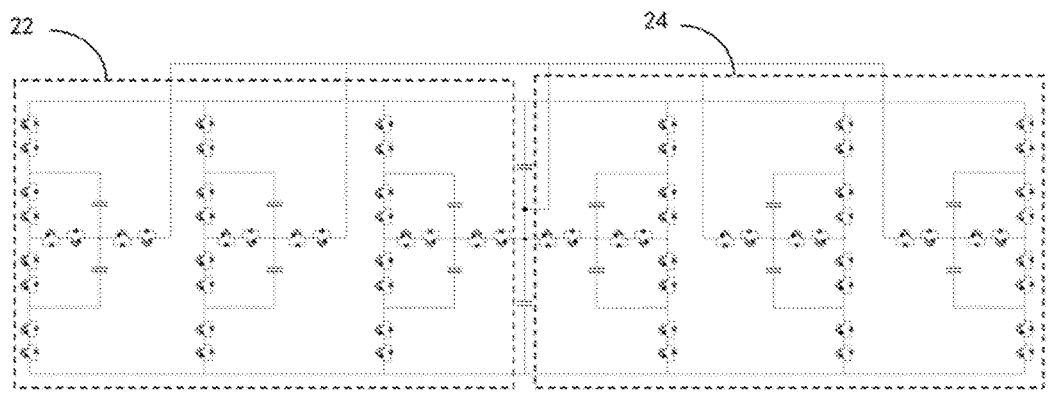
FIG. 8 is a schematic view showing the topology of the main circuit of a rectifying, inverting, symmetric voltage source type five-level converter.
Figure 9:
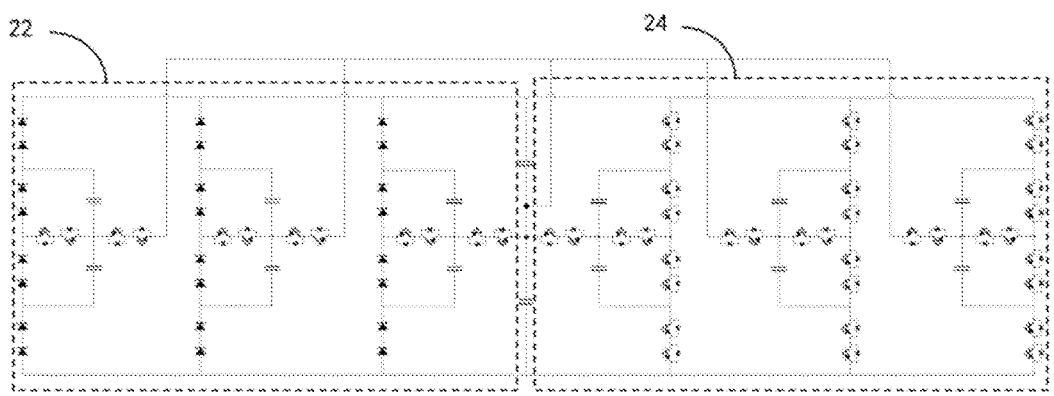
FIG. 9 is a schematic view showing the topology of the main circuit of a rectifying, inverting, asymmetric voltage source type five-level converter.

It is worth noting that the motor-side converter and the grid-side converter in the above-mentioned embodiment may be voltage source type three-level converter circuits or voltage source type five-level converter circuits. For example, please refer to FIGS. 6-9. FIG. 6 is a schematic view showing the topology of the main circuit of a rectifying, inverting, asymmetric voltage source type three-level converter; FIG. 7 is a schematic view showing the topology of the main circuit of a rectifying, inverting, symmetric voltage source type flying capacitor three-level converter; FIG. 8 is a schematic view showing the topology of the main circuit of a rectifying, inverting, symmetric voltage source type five-level converter; and FIG. 9 is a schematic view showing the topology of the main circuit of a rectifying, inverting, asymmetric voltage source type five-level converter. But, the present disclosure is not limited thereto.

Figure 4:
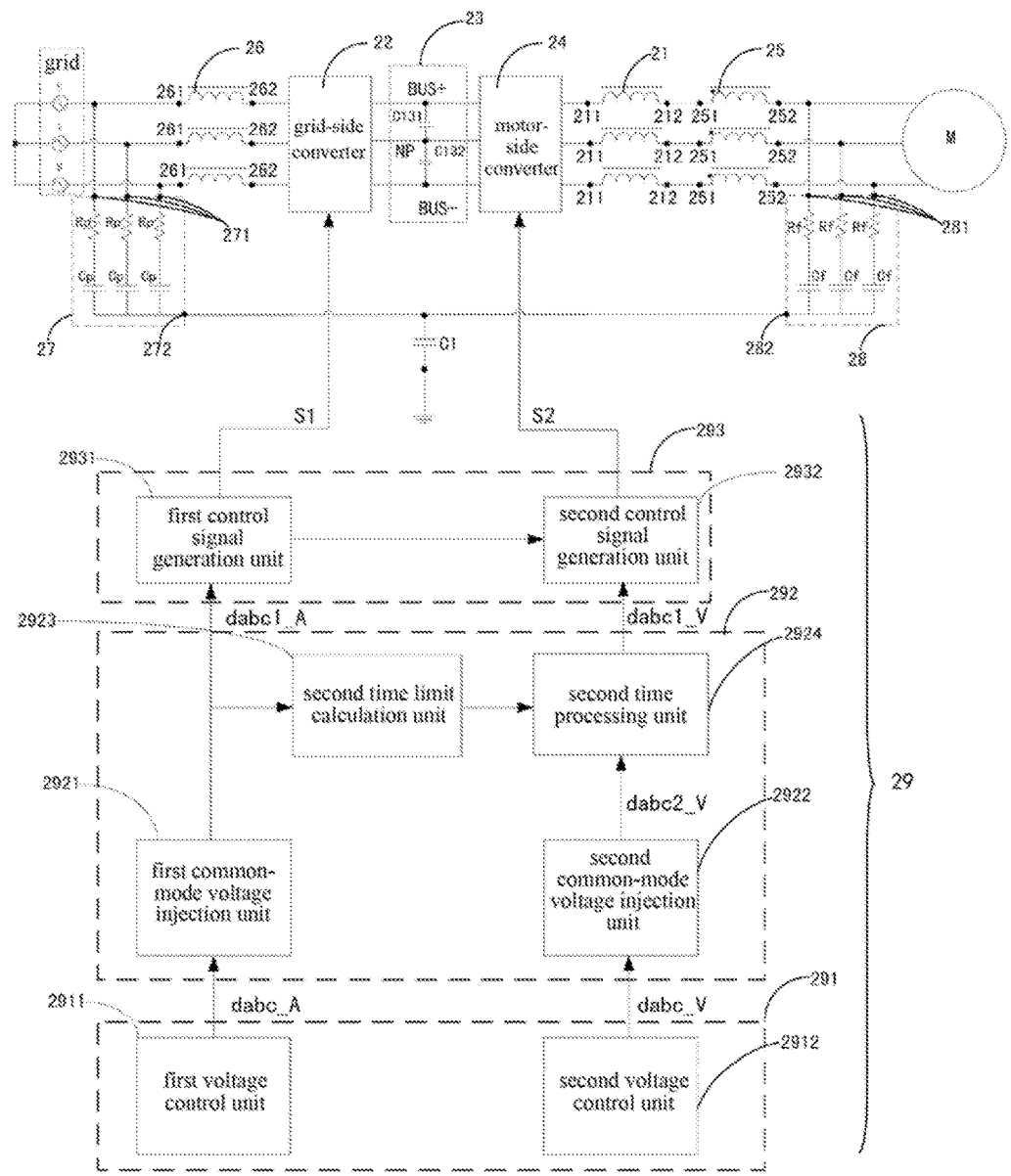
FIG. 4 is a schematic view showing the structure of the power conversion system in the fourth embodiment of the present disclosure.

Referring to FIG. 4, FIG. 4 is a schematic view showing the structure of the power conversion system in the fourth embodiment of the present disclosure. As shown in FIG. 4, the power conversion system according to the present disclosure further comprises a control means 29 electrically connected to the grid-side converter 22 and the motor-side converter 24, wherein the control means 29 can be applied to any one of the power conversion systems shown in FIGS. 1-3. The output voltage of the grid-side converter 22 and the grid voltage have the same frequency with less fluctuation, while the output voltage of the motor-side converter 24 and the voltage of the stator of the motor M have the same frequency varying from zero to the maximum operating frequency. Typically, the frequency of the output voltage of the grid-side converter 22 is different from the frequency of the output voltage of the motor-side converter 24. In order to improve the capability of the grid-side converter 22 to output voltage and the capability of the motor-side converter 24 to output voltage, generally the control means 29 is required to inject low-frequency (LF) common-mode voltage into a first voltage dabc_A and a second voltage dabc_V, respectively. The control means 29 injects a first common-mode voltage into the first voltage dabc_A to output a first control signal S1, and the control means 29 injects a second common-mode voltage into the second voltage dabc_V to output a second control signal S2. The grid-side converter 22 and the motor-side converter 24 include power semiconductor switches, and the first control signal S1 and the second control signal S2 are configured to control the ON or OFF of the power semiconductor switches of the grid-side converter 22 and the motor-side converter 24, respectively, so as to reduce the common-mode voltage of the power conversion system. In addition, the common-mode voltage is suppressed in the second reactor 25, wherein the common-mode voltage of the power conversion system is a difference between the common-mode voltage of the grid-side converter 22 and the common-mode voltage of the motor-side converter 24.

Further, the control means 29 comprises a voltage control module 291, a common-mode voltage control module 292 and a control signal generation module 293. The voltage control module 291 outputs the first voltage dabc_A and the second voltage dabc_V. The common-mode voltage control module 292 is coupled to the voltage control module 291. The common-mode voltage control module 292 receives the first voltage dabc_A and the second voltage dabc_V output by the voltage control module 291, injects a first common-mode voltage into the first voltage dabc_A to output a first rectified voltage control signal dabc1_A, and injects a second common-mode voltage into the second voltage dabc_V to output a first inverted voltage control signal dabc1_V. The control signal generation module 293 receives the first rectified voltage control signal dabc1_A and the first inverted voltage control signal dabc1_V, and compares the first rectified voltage control signal dabc1_A and the first inverted voltage control signal dabc1_V with a first carrier signal and a second carrier signal, respectively, to generate the corresponding first control signal S1 and second control signal S2. Now refer to FIGS. 6-9 again. In FIG. 6, the grid-side converter is a Vienna converter in which energy flows unidirectionally, while the motor-side converter is a diode-clamped voltage source type converter; in FIG. 7, both the grid-side converter and the motor-side converter are of a voltage source type flying capacitor three-level converter topological structure in which energy flows bidirectionally. As shown in FIGS. 6-9, both the grid-side converter and the motor-side converter comprise a plurality of power semiconductor switches, and the first control signal S1 and the second control signal S2 are configured to control the ON or OFF of the plurality of power semiconductor switches of the grid-side converter 22 and the motor-side converter 24, respectively, so as to effectively suppress the common-node voltage of the power conversion system.

Still further, the voltage control module 291 comprises a first voltage control unit 2911 and a second voltage control unit 2912. The first voltage control unit 2911 receives the voltage and current of the grid and the voltage of the bus capacitor, to output the first voltage dabc_A. The second voltage control unit 2912 receives the output current of the motor-side converter 24, the set value for the rotate speed of the motor M, the measured value of the rotate speed of the motor or the input voltage of the motor, to output the second voltage dabc_V. The common-mode voltage control module 292 comprises a first common-mode voltage injection unit 2921, a second common-mode voltage injection unit 2922, a second time limit calculation unit 2923 and a second time processing unit 2924. The first common-mode voltage injection unit 2921 receives the first voltage dabc_A, and injects a first common-mode voltage into the first voltage dabc_A to output the first rectified voltage control signal dabc1_A; the second common-mode voltage injection unit 2922 receives the second voltage dabc_V, and injects a second common-mode voltage into the second voltage dabc_V to output a second inverted voltage control signal dabc2_V.

Figure 10:
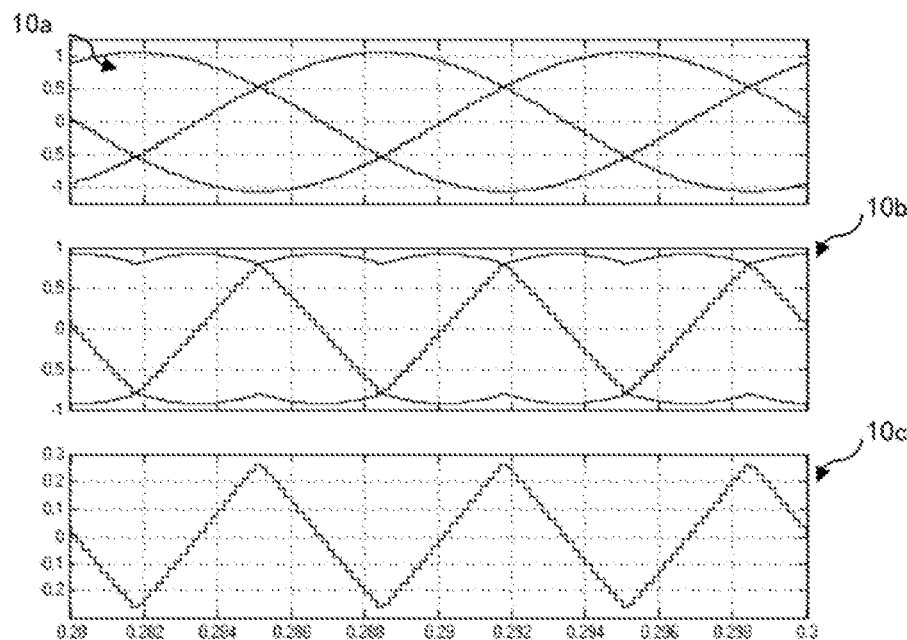
FIG. 10 shows the waveform of the first rectified voltage control signal and the waveform of the common-mode voltage when a triangular wave common-mode voltage is injected.
Figure 11:
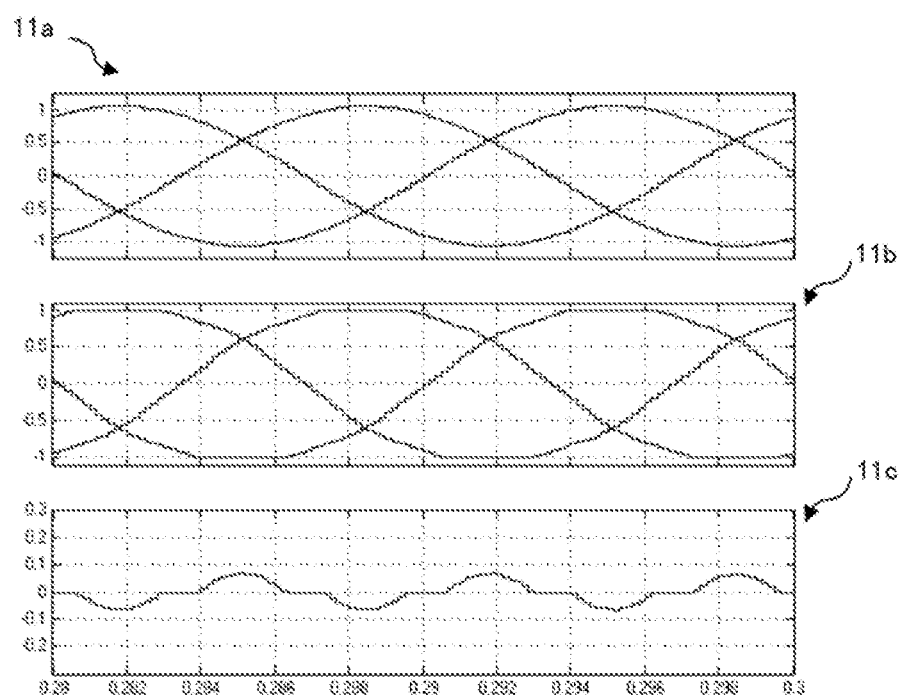
FIG. 11 shows the waveform of the first inverted voltage control signal and the waveform of the common-mode voltage when the minimum common-mode voltage is injected in the case of a high modulation degree.

Referring to FIGS. 10-11, FIG. 10 shows the waveform of the first rectified voltage control signal and the waveform of the common-mode voltage when the common-mode voltage in triangular wave is injected; and FIG. 11 shows the waveform of the first inverted voltage control signal and the waveform of the common-mode voltage when a minimum common-mode voltage is injected in the case of a high modulation degree. In FIG. 10, 10a denotes the waveform of the first voltage dabc_A output by the first voltage control unit 2911, 10b denotes the waveform of the first rectified voltage control signal dabc1_A output after the injection of the first common-mode voltage, and 10c denotes the waveform of the first common-mode voltage. In FIG. 11, 11a denotes the waveform of the second voltage dabc_V output by the second voltage control unit 2912, 11b denotes the waveform of the second inverted voltage control signal dabc2_V output after the injection of the second common-mode voltage, and 11c denotes the waveform of the second common-mode voltage. The minimum common-mode voltage which satisfies linear line voltage modulation is injected into the second voltage dabc_V. When the modulation degree is not high and linear modulation can be carried out without injecting the second common-mode voltage into the second voltage dabc_V, the second common-mode voltage can be reduced to zero.

Figure 12:
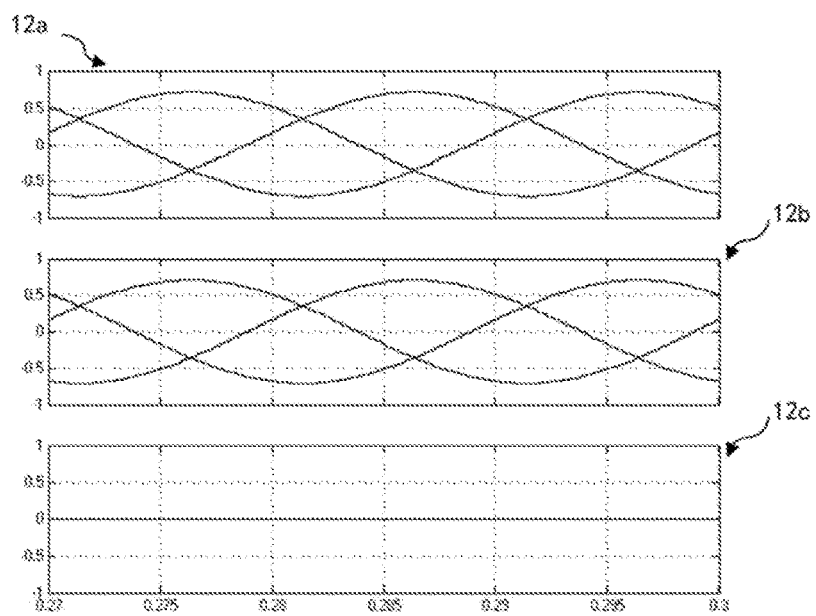
FIG. 12 shows the waveform of the first inverted voltage control signal and the waveform of the common-mode voltage when the minimum common-mode voltage is injected in the case of a low modulation degree.

Referring to FIG. 12, FIG. 12 shows the waveform of the second inverted voltage control signal and the waveform of the common-mode voltage when the minimum common-mode voltage is injected in the case of a low modulation degree, wherein 12a denotes the waveform of the second voltage dabc_V output by the second voltage control unit 2912, 12b denotes the waveform of the second inverted voltage control signal dabc2_V output after the injection of the second common-mode voltage, and 12c denotes the waveform of the second common-mode voltage. The peak value of the second voltage dabc_V is less than 1, and the second common-mode voltage injected into the second voltage dabc_V drops to zero, thus the common-mode voltage of the power conversion system can be reduced, thereby reducing the voltage to ground at the point where the power conversion system is connected to the grid.

In addition, the first common-mode voltage and the second common-mode voltage of the power conversion system each are one of a triangular wave common-mode voltage, a sine wave common-mode voltage and a minimum common-mode voltage, wherein the first common-mode voltage and the second common-mode voltage is three times larger than the first voltage, but the present disclosure is not limited thereto.

The second time limit calculation unit 2923 receives the first rectified voltage control signal dabc1_A, and calculates and outputs the limit value of the redundant vector action time of the motor-side converter. The second time processing unit 2924 receives the limit value and the second inverted voltage control signal dabc2_V and adjusts the redundant vector action time of the motor-side converter to output the first inverted voltage control signal dabc1_V. The control signal generation module 293 comprises a first control signal generation unit 2931 and a second control signal generation unit 2932, wherein the first control signal generation unit 2931 receives the first rectified voltage control signal dabc1_A and compares the first rectified voltage control signal dabc1_A with a first carrier signal Z1 to generate a corresponding first control signal S1, and wherein the second control signal generation unit 2932 receives the first inverted voltage control signal dabc1_V and compares the first inverted voltage control signal dabc1_V with a second carrier signal Z2 to generate a corresponding second control signal S2.

Figure 13:
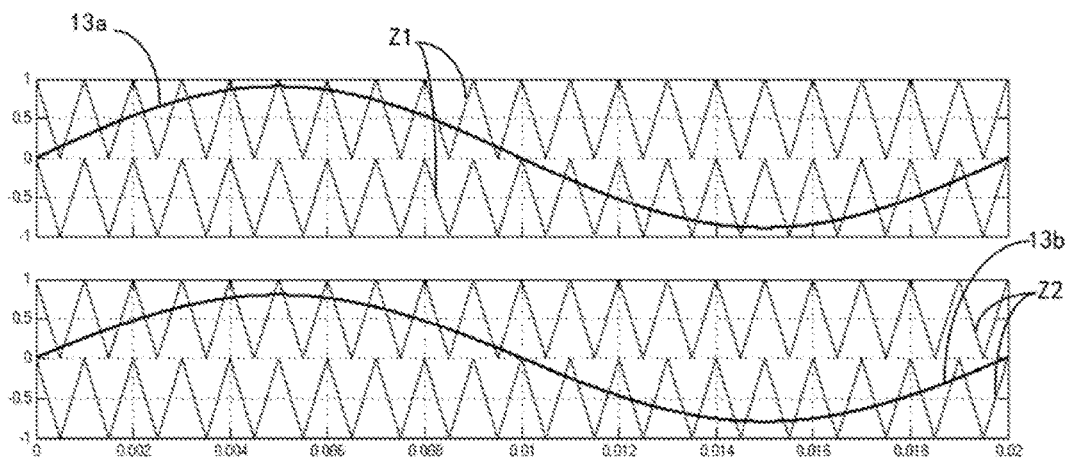
FIG. 13 is a schematic view showing the pulse width modulation mode with the positive and negative triangular carrier signals being same phase and stacked in the topological structure of a three-level converter.

Referring to FIG. 13, FIG. 13 is a schematic view showing the pulse width modulation mode with the positive and negative triangular carrier signals being same phase and stacked in the topological structure of a three-level converter. In FIG. 13, 13a denotes the first rectified voltage control signal, and 13b denotes the first inverted voltage control signal. In this embodiment, the first carrier signal Z1 and the second carrier signal Z2 are synchronous and have the same phase, wherein both of the first and the second carrier signals are two unipolar triangular waves, but the present disclosure is not limited thereto.

Figure 5:
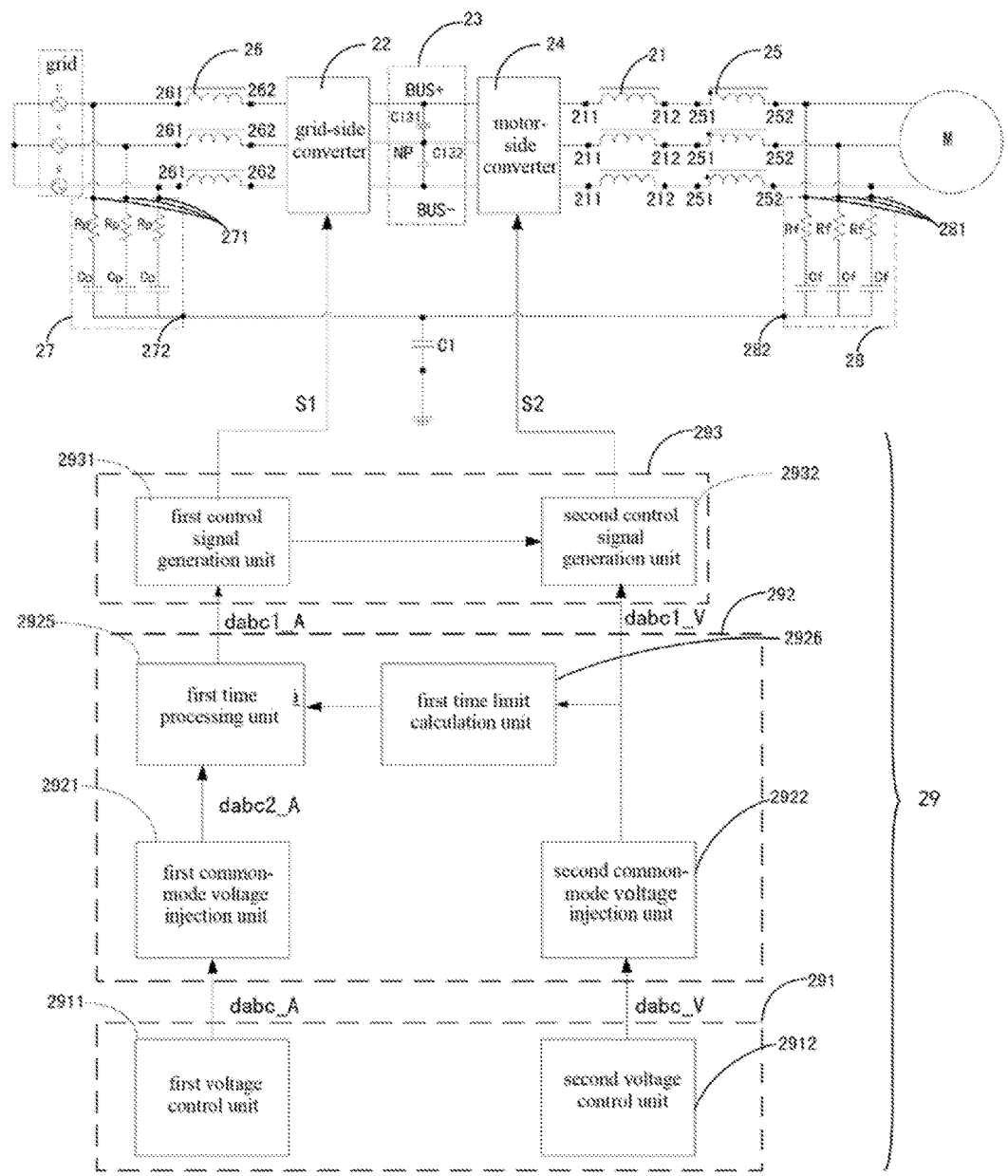
FIG. 5 is a schematic view showing the structure of the power conversion system in the fifth embodiment of the present disclosure.

Referring to FIG. 5, FIG. 5 is a schematic view showing the structure of the power conversion system in the fifth embodiment of the present disclosure. As shown in FIG. 5, the power conversion system shown in FIG. 5 is substantially the same as that shown in FIG. 4 in terms of structure and principle. The same parts will not be repeated here, and the different parts will be described below. In the power conversion system shown in FIG. 5, the common-mode voltage control module 292 comprises a first common-mode voltage injection unit 2921, a second common-mode voltage injection unit 2922, a first time limit calculation unit 2926 and a first time processing unit 2925. The first common-mode voltage injection unit 2921 receives a first voltage dabc_A, and injects a first common-mode voltage into the first voltage dabc_A to output a second rectified voltage control signal dabc2_A. The second common-mode voltage injection unit 2922 receives a second voltage dabc_V, and injects a second common-mode voltage into the second voltage dabc_V to output a first inverted voltage control signal dabc1_V. The first time limit calculation unit 2926 receives the first inverted voltage control signal dabc_V, and calculates and outputs the limit value of the redundant vector action time of the grid-side converter. The first time processing unit 2925 receives the limit value and the second rectified voltage control signal and adjusts the redundant vector action time of the grid-side converter to output a first rectified voltage control signal dabc1_A.

Figure 14:
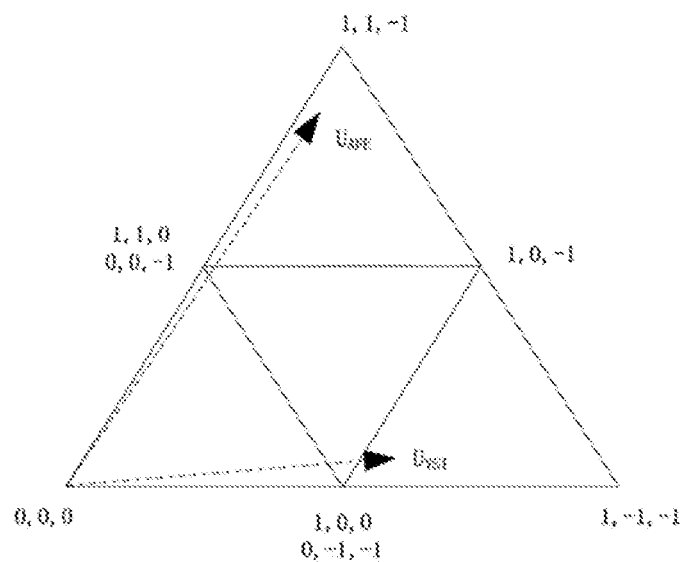
FIG. 14 is a schematic view showing the voltage vector of a voltage source type three-level converter topology working in a ⅙ power frequency cycle sector.

Referring to FIG. 14, FIG. 14 is a schematic view showing the voltage vector of a voltage source type three-level converter topology working in a ⅙ power frequency cycle sector. UAFE denotes the voltage vector output by the grid-side converter, UVSI denotes the voltage vector output by the motor-side converter, 1 in the voltage vector diagram denotes that the phase voltage output relative to the neutral point NP of the bus capacitor is +Vdc/2, 0 in the voltage vector diagram denotes that the phase voltage output relative to the neutral point NP of the bus capacitor is 0, and −1 in the voltage vector diagram denotes that the phase voltage output relative to the neutral point NP of the bus capacitor is −Vdc/2. Taking the seven-segment switching sequence commonly used in a power source type three-level converter circuit as an example, the step amplitude of the common-mode voltage each time the power semiconductor switches are turned on or off is ⅙Vdc, and the sequence of the common-mode voltage in a switching cycle can be summarized as the following two cases, namely:

| | | | | | | | |
|---|---|---|---|---|---|---|---|
| 1) | ⅓ Vdc | ⅙ Vdc | 0 | −⅙ Vdc | 0 | ⅙ Vdc | ⅓ Vdc |
| 2) | ⅙ Vdc | 0 | −⅙ Vdc | −⅓ Vdc | −⅙ Vdc | 0 | ⅙ Vdc |

Since the above-mentioned seven-segment in a cycle, adjacent half cycles of switching sequence are symmetrical, it can be simplified such that the following switching sequence in a half cycle is analyzed:

| 1) | ⅓ Vdc | ⅙ Vdc | 0 | −⅙ Vdc |
| 2) | ⅙ Vdc | 0 | −⅙ Vdc | −⅓ Vdc |

As regards the three-level voltage vector sequence within the half cycle, one redundant vector is taken as the starting voltage vector, and another one is taken as the closing voltage vector. In the three-level voltage vector sequence, there are two kinds of voltage vectors corresponding to the line voltage of ½Vdc, and the two are mutually redundant. For example, the vector states (1, 0, 0) and (0, −1, −1) in the voltage vector diagram are mutually redundant, with the same corresponding line voltages and different output effects of common-mode voltage, i.e., the common-mode voltage corresponding to the vector (1, 0, 0) is ⅙ Vdc, while the common-mode voltage corresponding to the vector (0, −1, −1) is −⅓Vdc.

Under the circumstance that the first carrier Z1 and the second carrier Z2 are synchronous and have the same phase, there are four combinations of the common-mode voltage sequences of the grid-side converter 22 and the motor-side converter 24:

Combination 1:

The common-mode voltage sequence of the grid-side converter 22:

| ⅓ Vdc | ⅙ Vdc | 0 | −⅙ Vdc |

The common-mode voltage sequence of the motor-side converter 24:

| ⅙ Vdc | 0 | −⅙ Vdc | −⅓ Vdc |

Combination 2:

The common-mode voltage sequence of the grid-side converter 22:

| ⅓ Vdc | ⅙ Vdc | 0 | −⅙ Vdc |

The common-mode voltage sequence of the motor-side converter 24:

| ⅓ Vdc | ⅙ Vdc | 0 | −⅙ Vdc |

Combination 3:

The common-mode voltage sequence of the grid-side converter 22:

| ⅙ Vdc | 0 | −⅙ Vdc | −⅓ Vdc |

The common-mode voltage sequence of the motor-side converter 24:

| ⅓ Vdc | ⅙ Vdc | 0 | −⅙ Vdc |

Combination 4:

The common-mode voltage sequence of the grid-side converter 22:

| ⅙ Vdc | 0 | −⅙ Vdc | −⅓ Vdc |

The common-mode voltage sequence of the motor-side converter 24:

| ⅙ Vdc | 0 | −⅙ Vdc | −⅓ Vdc |

For the grid-side converter 22 or the motor-side converter 24 the maximum common-mode voltage amplitude is ⅓Vdc.

Figure 15:
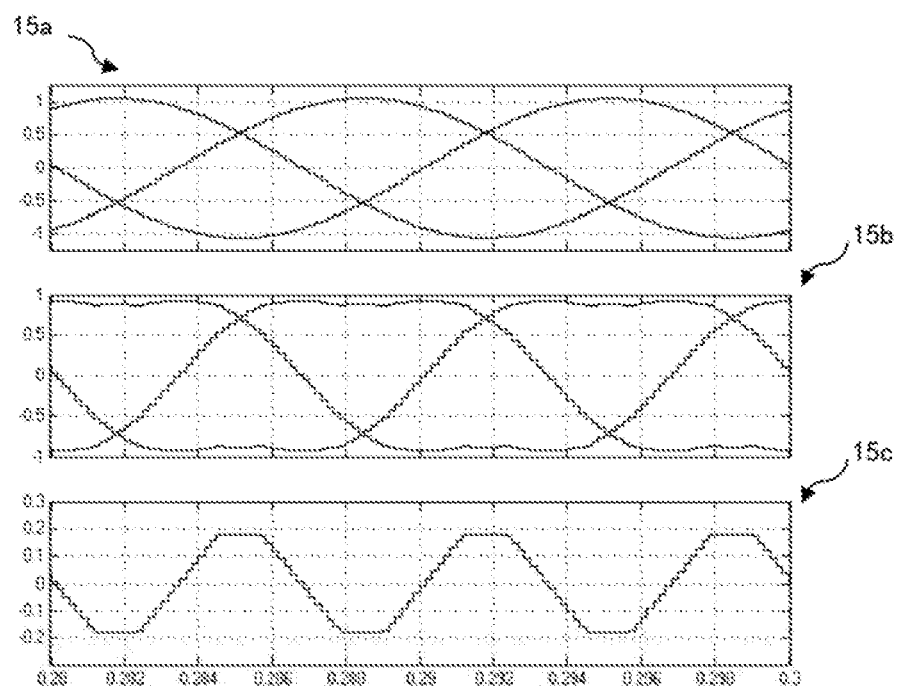
FIG. 15 shows the waveform of the first rectified voltage control signal and the waveform of the common-mode voltage when the amplitude of common-mode voltage is limited.

To avoid the overlap of the common-mode voltage with an amplitude of ⅓Vdc at the grid-side converter 22 and the common-mode voltage with an amplitude of −⅓Vdc at the motor-side converter 24, or the overlap of the common-mode voltage with an amplitude of −⅓Vdc at the grid-side converter 22 and the common-mode voltage with an amplitude of ⅓Vdc at the motor-side converter 24, the amplitude of the injected first common-mode voltage can be limited. Please refer to FIG. 15, which shows the waveform of the first rectified voltage control signal and the waveform of the common-mode voltage after the amplitude of common-mode voltage is limited, wherein 15a denotes the waveform of the first voltage dabc_A output by the first voltage control unit 2911, 15b denotes the waveform of the first rectified voltage control signal dabc1_A output after the injection of the first common-mode voltage, and 15c denotes the waveform of the first common-mode voltage, and wherein the amplitude of the first common-mode voltage is limited to a limit value, which ranges from 0 to ⅓ when the first rectified voltage control signal is normalized to the range of 0 to 1.

Figure 16:
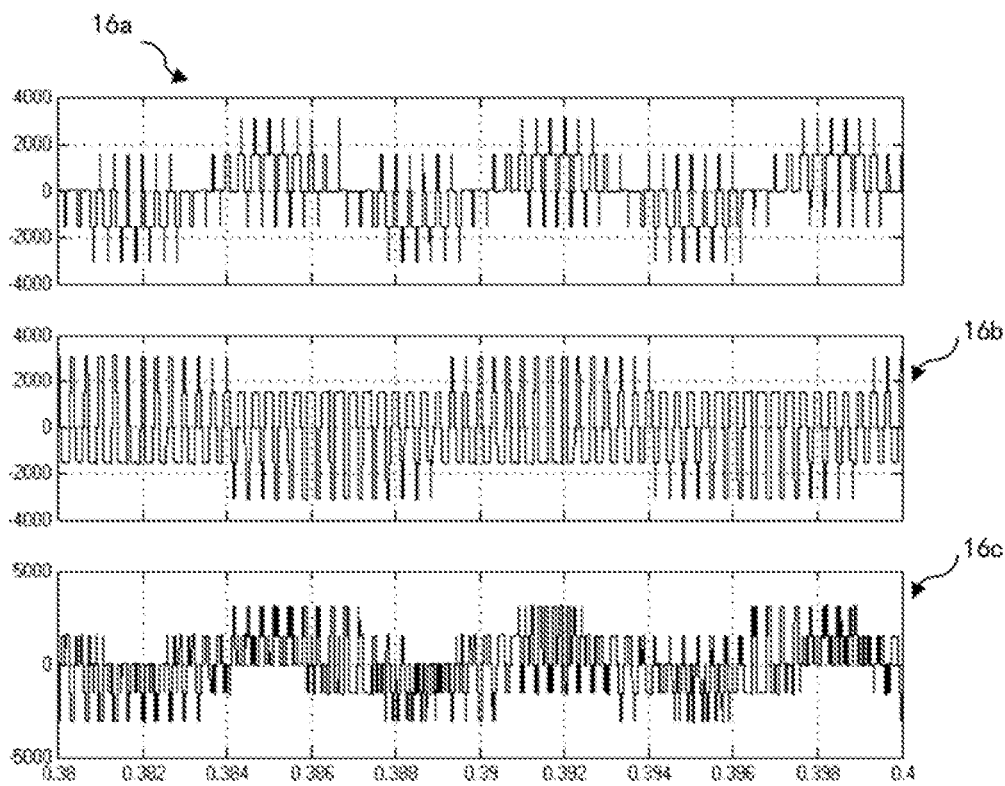
FIG. 16 is an example of common-mode voltage after the redundant vector processing in a voltage source type three-level conversion system.

When the common-mode voltage with an amplitude of ⅓Vdc at the grid-side converter 22 and the common-mode voltage with an amplitude of −⅙Vdc at the motor-side converter 24 overlap, or when the common-mode voltage with an amplitude of −⅓Vdc at the grid-side converter 22 and the common-mode voltage with an amplitude of ⅙Vdc at the motor-side converter 24 overlap, a common-mode voltage with an amplitude of ½Vdc will occur at the power conversion system. In order to reduce the insulation stress of the second reactor 25 and avoid the emergence of a common-mode voltage with an amplitude of ½Vdc at the power conversion system, the second time limit calculation unit 2923 is configured to receive the first rectified voltage control signal, calculate the limit value of the redundant vector action time of the motor-side converter 24 according to the first rectified voltage control signal, and then the second time processing unit 2924 is configured to receive the limit value and the second inverted voltage control signal and adjust the redundant vector action time of the motor-side converter 24, wherein the sum of the vector action times of the common-mode voltages with amplitudes of 0 and ⅙Vdc at the grid-side converter 22 is set as the limit value, the vector action time of the voltage with an amplitude of −⅓Vdc at the motor-side converter 24 is adjusted to ensure that the vector action time of the common-mode voltage with an amplitude of ⅙Vdc at the grid-side converter 22 does not overlap with that of the common-mode voltage with an amplitude of −⅓Vdc at the motor-side converter 24. For example, see FIG. 16. FIG. 16 is an example of common-mode voltage after redundant vector processing of a voltage source type three-level power conversion topological system. The maximum amplitude of the common-mode voltage of the power conversion system shown in FIG. 16 is ⅓Vdc, wherein 16a denotes the waveform of the common-mode voltage of the grid-side converter 22, 16b denotes the waveform of the common-mode voltage of the motor-side converter 24, and 16c denotes the waveform of the common-mode voltage of the power conversion system.

In this embodiment, the first time limit calculation unit 2926 is configured to receive the first inverted voltage control signal, calculate the limit value of the redundant vector action time of the grid-side converter 22 according to the first rectified voltage control signal. Then the first time processing unit 2925 is configured to receive the limit value and the first inverted voltage control signal, and adjust the redundant vector action time of the grid-side converter 22.

Figure 17:
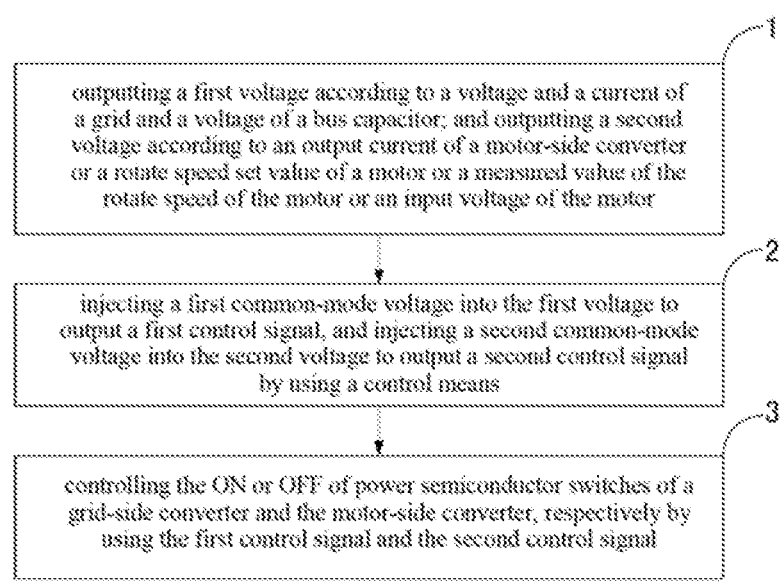
FIG. 17 is a flowchart of a method for suppressing the common-mode voltage of the power conversion system of the present disclosure.

Referring to FIG. 17, FIG. 17 is a flowchart of a method for suppressing the common-mode voltage of the power conversion system of the present disclosure. As shown in FIG. 17, the method for suppressing the common-mode voltage of a power conversion system according to the present disclosure is applied to a power conversion system described in any one of the above embodiments, the method for suppressing common-mode voltage comprising:

step 1: outputting a first voltage according to the voltage, the current and the bus capacitor of a grid; and outputting a second voltage according to the output current of a motor-side converter or the rotate speed set value of a motor or the measured value of the rotate speed of the motor or the input voltage of the motor;

step 2: injecting a first common-mode voltage into the first voltage by control means to output a first control signal, and injecting a second common-mode voltage into the second voltage to output a second control signal by using a control means; and step 3: controlling the ON or OFF of the power semiconductor switches of the grid-side converter and the motor-side converter, respectively by using the first control signal and the second control signal.

Figure 18:
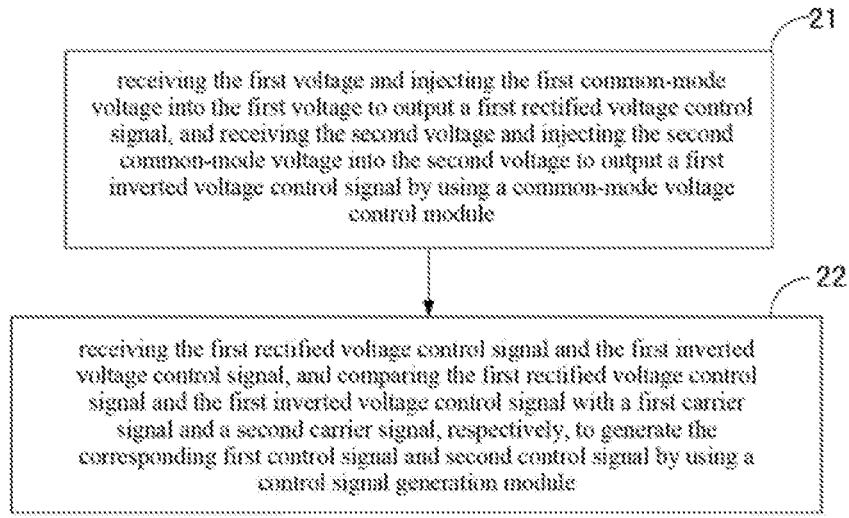
FIG. 18 is a flowchart of the substeps of step 2 in FIG. 17.

Referring to FIG. 18, which is a flowchart of the substeps of step 2 in FIG. 17. As shown in FIG. 18, step 2 further comprises:

step 21: receiving the first voltage and injecting the first common-mode voltage into first voltage to output a first rectified voltage control signal, and receiving the second voltage and injecting the second common-mode voltage into the second voltage to output a first inverted voltage control signal by using a common-mode voltage control module; and step 22: receiving the first rectified voltage control signal and the first inverted voltage control signal, and comparing the first rectified voltage control signal and the first inverted voltage control signal with a first carrier signal and a second carrier signal, respectively, to generate the corresponding first control signal and second control signal by using a control signal generation module.

Figure 19:
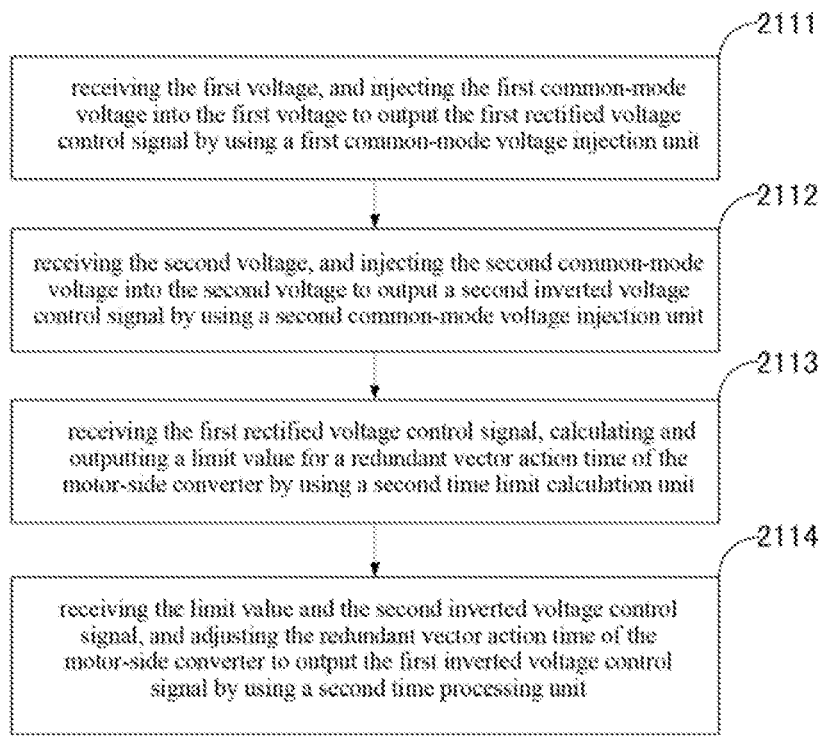
FIG. 19 is a flowchart of the substeps in one embodiment of step 21 in FIG. 18.

Referring to FIG. 19, which is a flowchart of the substeps in one embodiment of step 21 in FIG. 18. As shown in FIG. 19, step 21 further comprises:

step 2111: receiving the first voltage, and injecting the first common-mode voltage into the first voltage to output the first rectified voltage control signal by using a first common-mode voltage injection unit;

step 2112: receiving the second voltage, and injecting the second common-mode voltage into the second voltage to output a second inverted voltage control signal by using a second common-mode voltage injection unit;

step 2113: receiving the first rectified voltage control signal, calculating and outputting the limit value of the redundant vector action time of the motor-side converter by using a second time limit calculation unit; and step 2114: receiving the limit value and the second inverted voltage control signal, and adjusting the redundant vector action time of the motor-side converter to output the first inverted voltage control signal by using a second time processing unit.

Figure 20:
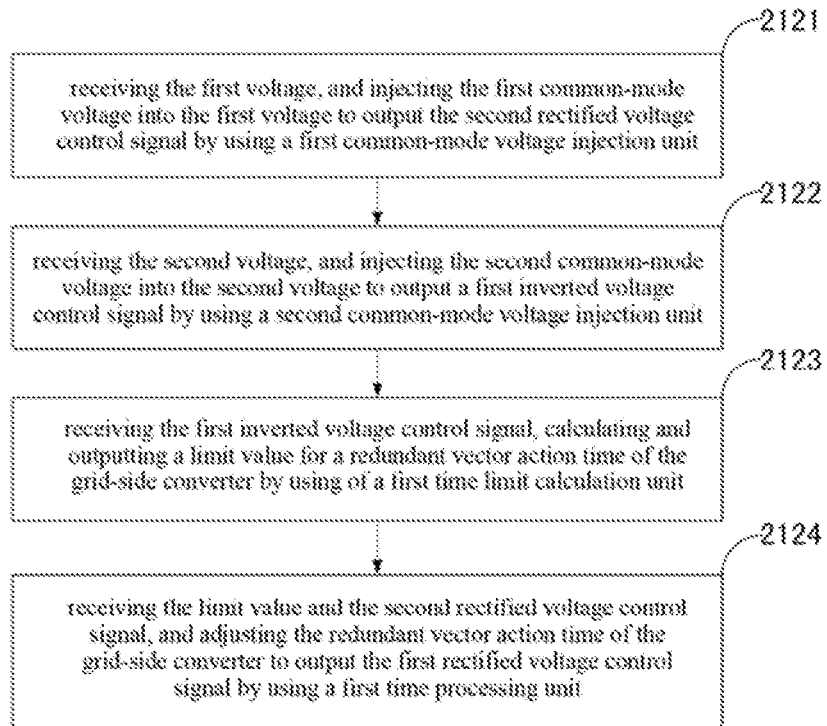
FIG. 20 is a flowchart of the substeps in another embodiment of step 21 in FIG. 18.

Referring to FIG. 20, which is a flowchart of the substeps in another embodiment of step 21 in FIG. 18. As shown in FIG. 20, step 21 further comprises:

step 2121: receiving the first voltage, and injecting the first common-mode voltage into the first voltage to output the second rectified voltage control signal by using a first common-mode voltage injection unit;

step 2122: receiving the second voltage, and injecting the second common-mode voltage into the second voltage to output a first inverted voltage control signal by using a second common-mode voltage injection unit;

step 2123: receiving the first inverted voltage control signal, calculating and outputting the limit value of the redundant vector action time of the grid-side converter by using of a first time limit calculation unit; and step 2124: receiving the limit value and the second rectified voltage control signal, and adjusting the redundant vector action time of the grid-side converter to output the first rectified voltage control signal by using a first time processing unit.

Figure 21:
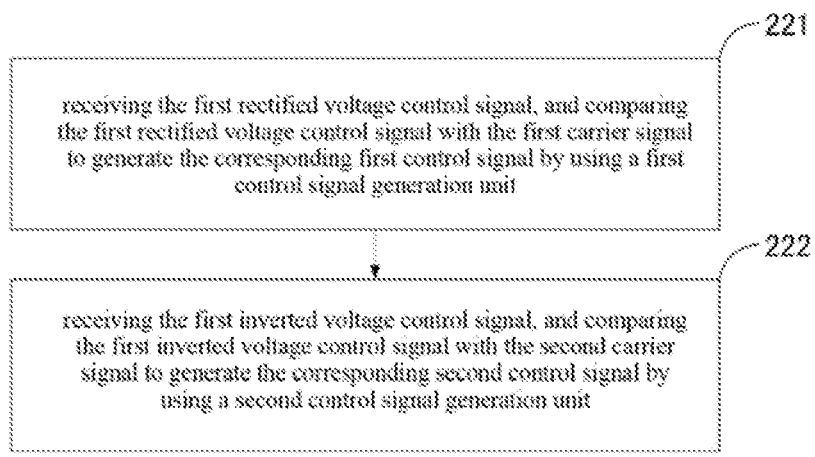
FIG. 21 is a flowchart of the substeps of step 22 in FIG. 18.

Referring to FIG. 21, which is a flowchart of the substeps of step 22 in FIG. 18. As shown in FIG. 21, step 22 further comprises:

step 221: receiving the first rectified voltage control signal, and comparing the first rectified voltage control signal with a first carrier signal to generate the corresponding first control signal by using a first control signal generation unit; and step 222: receiving the first inverted voltage control signal, and comparing the first inverted voltage control signal with a second carrier signal to generate the corresponding second control signal by using a second control signal generation unit.

It is worth noting that the first carrier signal and the second carrier signal are synchronous and have the same phase, but the present disclosure is not limited thereto.

The above are only the preferred embodiments of the present disclosure, but are not used for limiting the scope of the present disclosure. Those skilled in the art can make all kinds of corresponding changes and modifications according to the present disclosure without departing from the spirit and essence of the present disclosure. It is intended that all these changes and modifications be covered by the appended claims of the present disclosure.

The invention claimed is:

1. A power conversion system, characterized in that the power conversion system comprises:
a grid-side converter;
a motor-side converter;
a bus capacitor, the bus capacitor being electrically connected between the grid-side converter and the motor-side converter;
a first reactor, which includes a first terminal and a second terminal, the first terminal of the first reactor being electrically connected to the motor-side converter;
a second reactor, which includes a first terminal and a second terminal, the first terminal of the second reactor being electrically connected to the second terminal of the first reactor and the second terminal of the second reactor being electrically connected to a motor;

a third reactor, which includes a first terminal and a second terminal, the first terminal of the third reactor being electrically connected to a grid and the second terminal of the third reactor being electrically connected to the grid-side converter; and a control means electrically connected to the grid-side converter and the motor-side converter, the control means injecting a first common-mode voltage into a first voltage to output a first control signal, and injecting a second common-mode voltage into a second voltage to output a second control signal, so as to reduce a common-mode voltage of the power conversion system.

2. The power conversion system according to claim 1, further comprising a first filter network including a first terminal and a second terminal, the first terminal of the first filter network being electrically connected to the grid and the first terminal of the third reactor.

3. The power conversion system according to claim 2, further comprising a second filter network including a first terminal and a second terminal, the first terminal of the second filter network being electrically connected to the second terminal of the second reactor and the motor; wherein the second terminal of the first filter network is electrically connected to the second terminal of the second filter network.

4. The power conversion system according to claim 3, further comprising a first capacitor including a first terminal and a second terminal, the first terminal of the first capacitor being electrically connected to the second terminal of the first filter network and the second terminal of the second filter network, and the second terminal of the first capacitor being grounded.

5. The power conversion system according to claim 4, further comprising a resistor connected in parallel with the first and second terminals of the first capacitor.

6. The power conversion system according to claim 3, further comprising a second capacitor including a first terminal and a second terminal, the first terminal of the second capacitor being electrically connected to the motor, and the second terminal of the second capacitor being grounded.

7. The power conversion system according to claim 1, wherein the motor-side converter and the grid-side converter are voltage source type three-level circuits or voltage source type five-level circuits.

8. The power conversion system according to claim 1, wherein the control means comprises:

a voltage control module, which outputs the first voltage and the second voltage;

a common-mode voltage control module, which receives the first voltage and injects the first common-mode voltage into the first voltage to output a first rectified voltage control signal, and receives the second voltage and injects the second common-mode voltage into the second voltage to output a first inverted voltage control signal; and a control signal generation module, which receives the first rectified voltage control signal and the first inverted voltage control signal, and compares the first rectified voltage control signal and the first inverted voltage control signal with a first carrier signal and a second carrier signal, respectively, to generate the corresponding first control signal and second control signal.

9. The power conversion system according to claim 8, wherein the first carrier signal and the second carrier signal are synchronous and have the same phase.

10. The power conversion system according to claim 8, wherein the voltage control module comprises a first voltage control unit and a second voltage control unit; wherein the first voltage control unit receives a voltage and current of the grid and a voltage of the bus capacitor to output the first voltage; and wherein the second voltage control unit receives an output current of the motor-side converter or a rotate speed set value of the motor or a measured value of the rotate speed of the motor or an input voltage of the motor, to output the second voltage.

11. The power conversion system according to claim 8, wherein the common-mode voltage control module comprises a first common-mode voltage injection unit, a second common-mode voltage injection unit, a second time limit calculation unit and a second time processing unit; wherein the first common-mode voltage injection unit receives the first voltage, and injects the first common-mode voltage into the first voltage to output the first rectified voltage control signal; wherein the second common-mode voltage injection unit receives the second voltage, and injects the second common-mode voltage into the second voltage to output a second inverted voltage control signal; wherein the second time limit calculation unit receives the first rectified voltage control signal, calculates and outputs a limit value for a redundant vector action time of the motor-side converter; and wherein the second time processing unit receives the limit value and the second inverted voltage control signal and adjusts the redundant vector action time of the motor-side converter, to output the first inverted voltage control signal.

12. The high-power conversion system according to claim 8, wherein the common-mode voltage control module comprises a first common-mode voltage injection unit, a second common-mode voltage injection unit, a first time limit calculation unit and a first time processing unit; wherein the first common-mode voltage injection unit receives the first voltage, and injects the first common-mode voltage into the first voltage to output the second rectified voltage control signal; wherein the second common-mode voltage injection unit receives the second voltage, and injects the second common-mode voltage into the second voltage to output a first inverted voltage control signal; wherein the first time limit calculation unit receives the first inverted voltage control signal, calculates and outputs a limit value for a redundant vector action time of the grid-side converter; and wherein the first time processing unit receives the limit value and the second rectified voltage control signal and adjusts the redundant vector action time of the grid-side converter, to output the first rectified voltage control signal.

13. The power conversion system according to claim 8, wherein the control signal generation module comprises a first control signal generation unit and a second control signal generation unit, wherein the first control signal generation unit receives the first rectified voltage control signal and compares the first rectified voltage control signal with the first carrier signal to generate the corresponding first control signal, and wherein the second control signal generation unit receives the first inverted voltage control signal and compares the first inverted voltage control signal with the second carrier signal to generate the corresponding second control signal.

14. The power conversion system according to claim 1, wherein the first common-mode voltage is a triangular wave common-mode voltage or sine wave common-mode voltage or minimum common-mode voltage, and the first common-mode voltage is three times larger than the first voltage.

15. The power conversion system according to claim 1, wherein the first reactor and the third reactor are differential mode reactors, and the second reactor is a common-mode reactor.

16. The power conversion system according to claim 1, wherein the grid-side converter and the motor-side converter include power semiconductor switches, and wherein the first control signal and the second control signal are configured to control the ON or OFF of the power semiconductor switches of the grid-side converter and the motor-side converter, respectively.

17. A method for suppressing common-mode voltage of a power conversion system, characterized in that it is applied to the power conversion system according to claim 1, the method comprising:
step 1: outputting a first voltage according to a voltage and a current of a grid and a voltage of a bus capacitor; and outputting a second voltage according to an output current of a motor-side converter or a rotate speed set value of a motor or a measured value of the rotate speed of the motor or an input voltage of the motor;
step 2: injecting a first common-mode voltage into the first voltage to output a first control signal, and injecting a second common-mode voltage into the second voltage to output a second control signal by using a control means; and
step 3: controlling the ON or OFF of power semiconductor switches of a grid-side converter and the motor-side converter, respectively by using the first control signal and the second control signal.

18. The method for suppressing common-mode voltage according to claim 17, wherein the step 2 further comprises:
step 21: receiving the first voltage and injecting the first common-mode voltage into the first voltage to output a first rectified voltage control signal, and receiving the second voltage and injecting the second common-mode voltage into the second voltage to output a first inverted voltage control signal by using a common-mode voltage control module; and
step 22: receiving the first rectified voltage control signal and the first inverted voltage control signal, and comparing the first rectified voltage control signal and the first inverted voltage control signal with a first carrier signal and a second carrier signal, respectively, to generate the corresponding first control signal and second control signal by using a control signal generation module.

19. The method for suppressing common-mode voltage according to claim 18, wherein the step 21 further comprises:
step 2111: receiving the first voltage, and injecting the first common-mode voltage into the first voltage to output the first rectified voltage control signal by using a first common-mode voltage injection unit;
step 2112: receiving the second voltage, and injecting the second common-mode voltage into the second voltage to output a second inverted voltage control signal by using a second common-mode voltage injection unit;
step 2113: receiving the first rectified voltage control signal, calculating and outputting a limit value for a redundant vector action time of the motor-side converter by using a second time limit calculation unit; and
step 2114: receiving the limit value and the second inverted voltage control signal, and adjusting the redundant vector action time of the motor-side converter to output the first inverted voltage control signal by using a second time processing unit.

20. The method for suppressing common-mode voltage according to claim 18, wherein the step 21 further comprises:
step 2121: receiving the first voltage, and injecting the first common-mode voltage into the first voltage to output the second rectified voltage control signal by using a first common-mode voltage injection unit;
step 2122: receiving the second voltage, and injecting the second common-mode voltage into the second voltage to output a first inverted voltage control signal by using a second common-mode voltage injection unit;
step 2123: receiving the first inverted voltage control signal, calculating and outputting a limit value for a redundant vector action time of the grid-side converter by using of a first time limit calculation unit; and
step 2124: receiving the limit value and the second rectified voltage control signal, and adjusting the redundant vector action time of the grid-side converter to output the first rectified voltage control signal by using a first time processing unit.

21. The method for suppressing common-mode voltage according to claim 18, wherein the step 22 further comprises:
step 221: receiving the first rectified voltage control signal, and comparing the first rectified voltage control signal with the first carrier signal to generate the corresponding first control signal by using a first control signal generation unit; and
step 222: receiving the first inverted voltage control signal, and comparing the first inverted voltage control signal with the second carrier signal to generate the corresponding second control signal by using a second control signal generation unit.

22. The method for suppressing common-mode voltage according to claim 18, wherein the first carrier signal and the second carrier signal are synchronous and have the same phase.

* * * * *